United States Patent [19]

Hammond et al.

[11] 4,252,285
[45] Feb. 24, 1981

[54] DYNAMIC SEAL FOR SLOTTED CYLINDER

[75] Inventors: Joseph Hammond, Cornwells Heights, Pa.; Donald A. Ward, Voorhees, N.J.

[73] Assignee: The United States of America as represented by the Secretary of the Navy, Washington, D.C.

[21] Appl. No.: 34,888

[22] Filed: Apr. 30, 1979

[51] Int. Cl.³ .............................................. B64F 1/04
[52] U.S. Cl. ..................................... 244/63; 92/88; 104/161; 124/61; 244/114 R; 277/189
[58] Field of Search ............. 244/63, 114 R; 104/155, 104/156, 157, 158, 159, 160, 161; 92/88, 163; 277/189; 124/56, 61, 71, 73, 75

[56] References Cited

U.S. PATENT DOCUMENTS

| 3,421,718 | 1/1969 | Gehringer et al. | 244/63 |
| 4,164,893 | 8/1979 | Granbom et al. | 92/88 |

FOREIGN PATENT DOCUMENTS

| 8283 | 10/1844 | France | 104/156 |
| 64302 | 11/1955 | France | 244/63 |
| 11184 | of 1846 | United Kingdom | 104/161 |
| 478427 | 1/1938 | United Kingdom | 244/63 |

Primary Examiner—Charles E. Frankfort
Attorney, Agent, or Firm—R. S. Sciascia; Henry Hansen; Armand M. Vozzo, Jr.

[57] ABSTRACT

An improved dynamic seal for the longitudinal slot in a pressurized cylinder of an aircraft catapult system having a shuttle adapted to travel at high speed through the slot. The seal includes a flexible, elongated sealing strip extended along the slot in sealing relation therewith to close the cylinder, and a series of ball detents mounted along the length of the slot on each side thereof for urging inwardly against the sides of the sealing strip thereby providing support for the strip throughout the length of the cylinder. When the shuttle, adapted to guide the strip internally of the cylinder as it passes therethrough, travels through the slot, the ball detents maintain the strip in sealing relation with the slot thereby preventing whipping of the strip forwardly of the moving shuttle.

5 Claims, 4 Drawing Figures

DYNAMIC SEAL FOR SLOTTED CYLINDER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to sealing devices, and more particularly to a system for sealing a pressurized cylinder having an elongated longitudinal slot through which a shuttle of an aircraft catapult travels at high speed.

In the field of aircraft catapults, cylindrical members having elongated longitudinal slots therein have been used to permit connection between a pressure-driven piston member that travels within the cylinder and a shuttle that carries or tows the aircraft to be launched. Such a slotted cylinder requires a means for sealing the slot in order to maintain operating pressure within the cylinder, and a variety of sealing devices have been devised for this purpose. One such type of seal devised for use in the slotted cylinder comprises essentially a single, elongated, ribbon-like strip held in place along the slot by tension applied to the ends of the strip. During operation of the catapult, the sealing strip is guided internally of the cylinder as the piston and shuttle travel therethrough by a cam-like surface on the moving piston.

While such a flexible, dynamic seal as described above has proven satisfactory in the slotted cylinders of aircraft catapults for lower shuttle speed and shorter operating strokes, problems have arisen in their use in catapults generating high shuttle speeds over extended operating strokes because of an increased tendency of the ribbon-like strips to whip forward of the moving piston under such conditions. Whipping of the strip forward of the piston produces a random wave motion in the strip that adversely effects the operation of the pressurized cylinder regardless of whether the cylinder is being used to launch the aircraft by accelerating the shuttle or to brake the shuttle after launch. Random wave motion of the strip can cause the strip to buckle and break thereby resulting in a loss of driving pressure behind the piston in the rearward chamber of the launch cylinder. In the case of a braking application where the forward chamber pressure of the cylinder should be maintained, unseating of the sealing strip caused by the random wave motion thereof renders the seal ineffective to maintain forward braking pressure in the cylinder.

Existing sealing strip systems for the slotted cylinders of aircraft catapults have not adequately resolved the problem of effectively supporting the sealing strip along the entire length of the slot to prevent whipping of the strip. Closures of this type have been devised that utilize fluid pressure within the cylinder to force the strip upwardly against the edge of the slot. However, such closures rely on the integrity of the closure itself to maintain the pressure which provides the seal of the closure, and accordingly a rupture at any point along the length of the closure will cause the very force, which holds the closure in sealed position, to be lost. Furthermore, such an application of the fluid pressure to the forward chamber of the cylinder in order to support the sealing strip acts in opposition to the driving pressure in the rearward chamber of the launch cylinder thereby resulting in the inefficient utilization of launch power.

SUMMARY OF THE INVENTION

Accordingly, it is a general purpose and object of the present invention to provide an improved seal for the longitudinal slot of a pressurized cylinder through which the shuttle of an aircraft catapult travels at high speed.

Another object of the present invention is to provide a dynamic sealing strip system for a slotted cylinder of an aircraft catapult in which the sealing strip is firmly supported and held in place along the slot throughout the entire length of the cylinder so that whipping of the strip is prevented during high speed operations and over long operating strokes.

A further object of the present invention is to provide an improved dynamic seal for the slotted cylinders of an aircraft catapult system which is equally effective in maintaining operating pressure within the cylinder for launching or braking operations.

A still further object of the present invention is to provide an improved closure for sealing the slot of a pressurized cylinder which is reliable and easy to install.

Briefly, these and other objects of the present invention are accomplished by an improved dynamic seal for the longitudinal slot in the pressurized cylinder of an aircraft catapult system having a shuttle adapted to travel at high speed through the slot. The seal includes a flexible, elongated sealing strip extended along the slot to close the cylinder, and a series of ball detents mounted along the length of the slot on each side thereof for urging inwardly against the sides of the sealing strip thereby providing support for the strip throughout the length of the cylinder. When the shuttle, which is adapted to guide the strip internally of the cylinder as it passes therethrough, travels through the slot, the ball detents maintain the strip in sealing relation with the slot and thereby prevent whipping of the strip forwardly of the moving shuttle.

For a better understanding of these and other aspects of the present invention, reference may be made to the following detailed description taken in conjunction with the accompanying drawings in which like reference numerals designate like parts throughout the figures thereof.

DESCRIPTION OF THE PREFERRED EMBODIMENT

Figure 1:
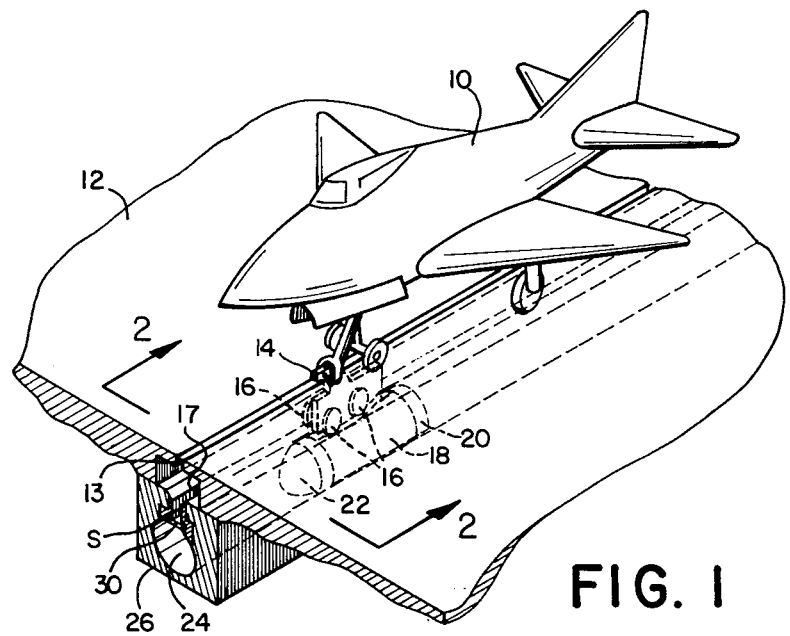
FIG. 1 illustrates an aircraft catapult system incorporating a slotted launch cylinder having a dynamic seal according to the present invention.

Referring now to FIG. 1, there is shown an aircraft 10 ready to be launched along the path of an elongated opening 13 in a platform 12, typically the deck of an aircraft carrier. A shuttle 14 passes through the opening 13 and is coupled to the aircraft 10 for towing the aircraft forwardly at a desired launch velocity. A set of rollers 16 are connected to the shuttle 14 in pairs, fore and aft, and ride within a channel 17 formed beneath the platform 12 to guide the shuttle 14 along the launch path.

A longitudinally-cambered member 18 is connected to shuttle 14 beneath channel 17 to slidingly travel within a launch cylinder 24. A piston member 20 is formed to fit snugly within launch cylinder 24 and is attached to the rearward end of member 18 for receiving a source of compressed air (not shown). A plunger 22 is connected to the forward end of member 18 to provide a retarding surface for the shuttle 16 after launch.

The launch cylinder 24 is suspended beneath platform 12 within a rigid supporting structure 26. The supporting structure 26 extends the length of opening 13 and is formed having a longitudinal slot S along the top portion thereof. The slot S passes through the supporting structure 26 to the top of launch cylinder 24 and is in vertical alignment with the opening 13 in platform 12. A flexible, elongated strip 30 is fixed at each end of the supporting structure 26 and tautly extended along the top of launch cylinder 24 to cover slot S and provide a seal for the cylinder. A plurality of ball detents 36, better shown in FIGS. 2 through 4 and described in greater detail hereinafter, are mounted on each side of slot S to urge against the sides of strip 30. Each side of the strip 30 is indented along the length thereof to insure intimate contact with the ball detents 36. The strip 30 is routed through cambered member 18 so that the strip is guided internally of launch cylinder 24 and deflected out of the forward path of shuttle 14 as the cambered member travels through the cylinder. The cambered member 18 upwardly directs strip 30 back between the ball detents 36, and the strip is returned into sealing position within slot S at the top of cylinder 24.

Figure 2:
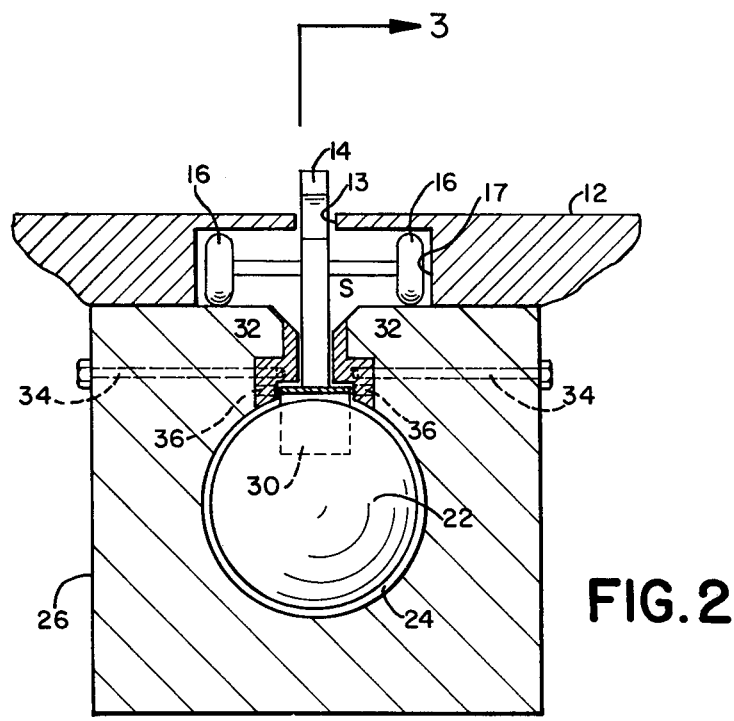
FIG. 2 is a sectional view taken along the line 2—2 of FIG. 1.
Figure 3:
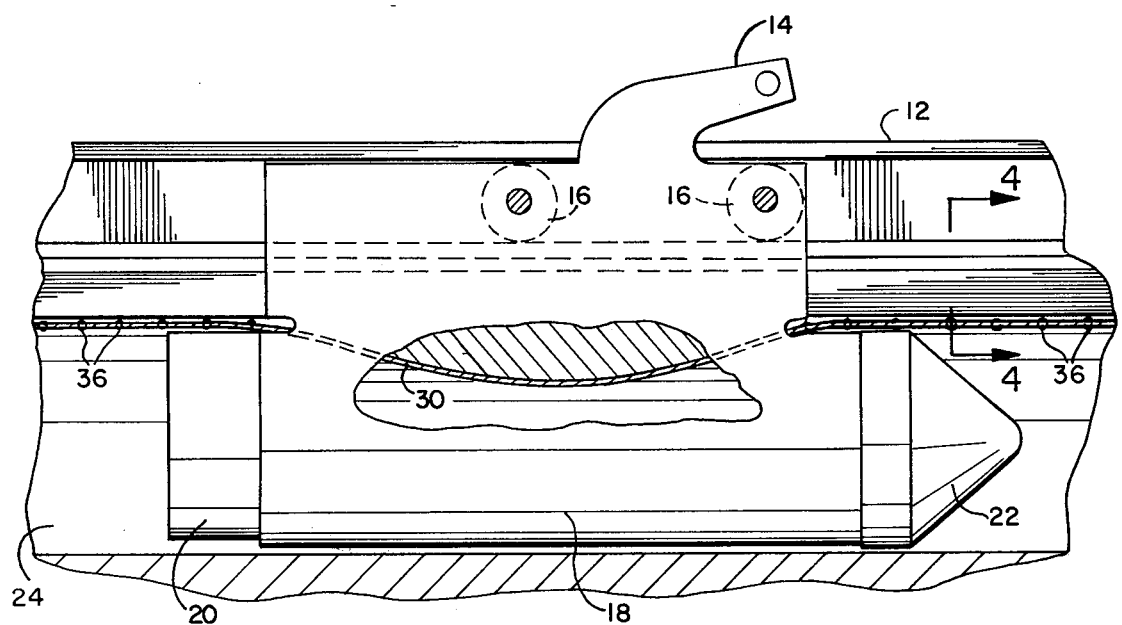
FIG. 3 is a sectional view taken along the line 3—3 of FIG. 2.

Referring now to FIGS. 2 and 3, the series of ball detents 36 are oppositely mounted on each side of slot S at the top of launch cylinder 24 to urge inwardly against the sides of sealing strip 30. The ball detents 36 are spaced apart along the length of launch cylinder 24 to provide firm support for the strip along the length thereof and thereby maintain the sealing position of the strip against slot S. A pair of elongated mounting blocks 32 are removably secured to the supporting structure 26 along opposite sides of slot S to properly position the ball detents 36 along the top of launch cylinder 24. The mounting blocks 32 are fabricated of a wear-resistant material, such as bronze, and are secured to the supporting structure 26 by a plurality of bolt members 34. The bolt members 34 are spaced apart along the length of the supporting structure 26 and are transversely inserted from each side thereof to threadingly engage the mounting blocks 32.

Figure 4:
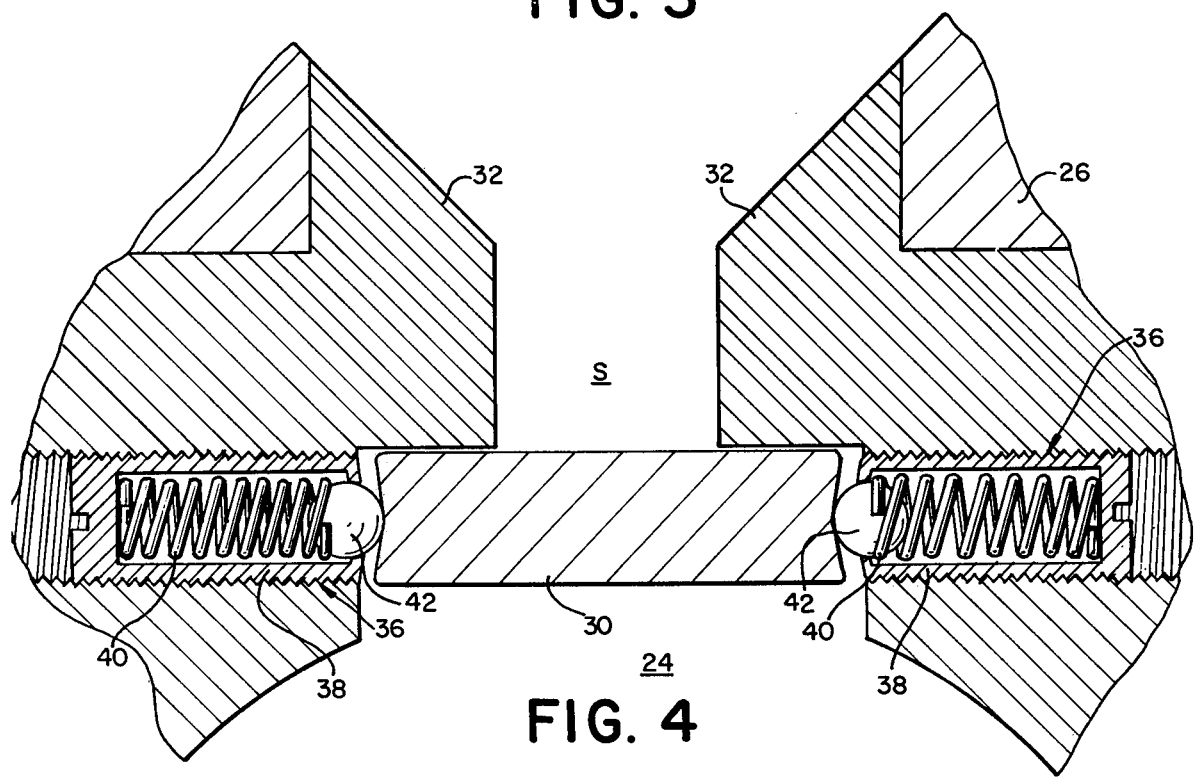
FIG. 4 is a sectional view taken along the line 4—4 of FIG. 3.

Referring now to FIG. 4, the ball detents 36 each include a threaded casing 38 containing a spring 40 under compression by a spherical member 42 which partially protrudes from one end of the casing so that the spherical member exerts a force upon a surface in intimate contact therewith. Each of the ball detents 36 is threadingly engaged within a mounting block 32 so that the spherical member 42 is mounted facing slot S. The positions of the ball detents 36 inward of slot S are adjustable within the mounting blocks 32 so that the spherical members 42 of each pair of oppositely mounted detents exert sufficient inward forces, typically less than fifty pounds, against the sides of strip 30 to firmly support the strip in its sealing position against slot S. The support provided by the ball detents 36 holds the strip 30 firmly in place against slot S forward of the moving shuttle 14 to prevent whipping of the strip from the high-speed deflection thereof through cambered member 18. A suitable ball detent is that manufactured by Vlier, Part No. SSBH-62.

Operation of the dynamic seal will now be summarized with reference to FIGS. 1 through 4. When compressed air is applied to the piston 20 inside the launch cylinder 24 formed within supporting structure 26, shuttle 14 is driven forwardly through the longitudinal slot S in the structure to permit aircraft 10 to be towed to launch velocity. Extended along slot S to seal the launch cylinder 24 and maintain the operating pressure therein, flexible strip 30 is guided through cambered member 18 so that the strip is deflected out of the forward path of shuttle 14. Mounted inwardly on each side of slot S along the top of launch cylinder 24, ball detents 36 urge against the indented sides of strip 30 to firmly support the strip throughout the extended length thereof and thereby prevent whipping motion of the strip forward of the cambered member 18 caused by high-speed deflection of the strip.

Therefore, it is apparent that the disclosed sealing system provides an improved closure for a longitudinally-slotted launch cylinder of an aircraft catapult by firmly supporting and holding in place a flexible sealing strip positioned within the slot along the length of the cylinder so that whipping of the strip is prevented as a high-speed shuttle travels through the cylinder over an extended launch stroke. In addition, the disclosed dynamic seal provides a system for maintaining operating pressure within the slotted cylinder of an aircraft catapult that is equally effective in launching and braking applications. Furthermore, the disclosed invention provides a sealing system which is reliable and easy to install.

Obviously, other embodiments and modifications of the present invention will readily come to those of ordinary skill in the art having the benefit of the teachings presented in the foregoing description and drawings. For example, the disclosed dynamic seal is similarly applicable within a slotted fluid brake cylinder through which a high-speed shuttle is decelerated. In such an embodiment, utilization of the dynamic seal effectively preserves braking pressure forward of the shuttle by providing firm support to the sealing strip within the cylinder. Therefore, it is to be understood that this invention is not to be limited thereto, and that said embodiments and modifications are intended to be included within the scope of the appended claims.

What is claimed is:

1. A system for launching a vehicle, comprising:
a shuttle adapted to carry the vehicle;
a pressurized cylinder having a longitudinal slot therein to permit passage of said shuttle;
an elongated strip having indented lateral edges and tautly extended through said cylinder sealingly adjacent to the slot, said strip being displaced from the slot internally of said cylinder as said shuttle passes therethrough; and
force exerting means connected to said cylinder along the slot and acting inwardly against the indented lateral edges of said strip substantially tangential to said cylinder for supporting said strip sealingly adjacent to the slot.

2. A launching system according to claim 1, wherein said force exerting means comprises:

a plurality of spring-loaded members mounted along the length of the slot in mutually opposed pairs transversely of the cylinder.

3. A launching system according to claim 2, wherein said spring-loaded members are ball detents.

4. A system for dynamically sealing a pressurized cylinder having a longitudinal slot therein to permit passage therethrough of a shuttle of an aircraft catapult, comprising:

an elongated strip having indented lateral edges and tautly extended through the cylinder sealingly adjacent to the slot, said strip being displaced from the slot as the shuttle passes therethrough; and a plurality of spring-loaded members mounted along the length of the slot in mutually opposed pairs transversely of the cylinder, said members being in urging contact with the indented lateral edges of said strip.

5. A dynamic sealing system according to claim 4, wherein said spring-loaded members are ball detents.

* * * * *